United States Patent
Horng et al.

(10) Patent No.: US 6,741,047 B2
(45) Date of Patent: May 25, 2004

(54) DUAL CURRENT-LIMITING CIRCUIT FOR DC BRUSHLESS MOTOR

(75) Inventors: Alex Horng, Kaohsiung (TW);
Yin-Rong Hung, Kaohsiung (TW);
Ying-Ya Lu, Kaohsiung Hsien (TW);
Ta-Lun Ko, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 20 days.

(21) Appl. No.: 10/183,596

(22) Filed: Jun. 28, 2002

(65) Prior Publication Data

US 2004/0000883 A1 Jan. 1, 2004

(51) Int. Cl.$^7$ ................................................ H02P 3/08
(52) U.S. Cl. ................ 318/254; 318/138; 318/430; 318/432; 318/434; 318/246; 318/439; 318/519
(58) Field of Search ........................... 318/138, 254, 318/430, 432, 434, 439

(56) References Cited

U.S. PATENT DOCUMENTS

| | | | | |
|---|---|---|---|---|
| 4,629,966 A | * | 12/1986 | Quantz | 322/25 |
| 5,170,106 A | * | 12/1992 | Ogasawara | 318/434 |
| 5,475,290 A | * | 12/1995 | Tani et al. | 318/434 |
| 5,554,913 A | * | 9/1996 | Ohsawa | 318/434 |
| 6,268,708 B1 | * | 7/2001 | Kawada et al. | 318/430 |
| 6,556,778 B2 | * | 4/2003 | Zhang et al. | 388/806 |
| 6,611,117 B1 | * | 8/2003 | Hardt | 318/254 |

* cited by examiner

Primary Examiner—Kimberly Lockett
Assistant Examiner—Tyrone Smith
(74) Attorney, Agent, or Firm—Bacon & Thomas, PLLC

(57) ABSTRACT

A dual current-limiting circuit for a dc brushless motor includes an over-current detective circuit, an operation detective circuit, and a current-limiting circuit. The over-current detective circuit produces a voltage signal used to determine whether an over-current has been input to the motor. The operation detective circuit also produces a voltage signal used to determine whether the motor is being operated in a normal manner. The current-limiting circuit decides to turn on a first switch of a first current-limiting circuit and to subsequently turn on a second switch of a second current-limiting circuit depending upon the two voltage signals. The current-limiting circuit is capable of suppressing current passing through a coil at a low voltage level, which is inadequate to damage a driver circuit and still adequate to restart the motor if an abnormal input current is eliminated.

8 Claims, 4 Drawing Sheets

DUAL CURRENT-LIMITING CIRCUIT FOR DC BRUSHLESS MOTOR

BACKGROUND OF THE INVENTION

1. Field of the Invention

The present invention is related to a dual current-limiting circuit for a dc brushless motor and more particularly to a current-limiting circuit for operating a dc brushless motor while locked or in a failure condition, and to utilizing a dual current-limiting method to tremendously reduce current passing through two ends of a coil, so as to limit current and provide a low voltage level which is adequate for restarting the motor when the failure condition is eliminated.

2. Description of the Related Art

When a motor is locked or motor speed is decreased due to dust and dirt, both the motor current passing through a coil and heat produced thereon may tremendously increase. The insulated cover of the coil is heated, thereby resulting in deterioration and cracking due to high temperature. In order to prevent great current from passing through the coil while the fan motor is locked or fails to operate in a normal manner, an auto restart function has been built in a drive circuit of the motor. When the fan motor is operated abnormally, the drive circuit generates time-intermittent signals to allow current passing through the coil short-term (a few seconds) for avoiding great current continuously passing therethrough. If abnormal operation of the fan motor cannot still be eliminated after the current continuously passes therethrough short-term, it interrupts the current to pause the operation. After interrupting a short-term currently supply, an auto restart circuit restarts the motor fan to allow current to pass through the coil.

The restart function of the fan motor is periodically repeated as long as abnormal operation is not eliminated. It is available only for low airflow or low power consumption fan motors since the restart function, which uses maximum current manner, may consume great pulse current for restarting.

FIG. 1 illustrates a schematic view of a conventional driver circuit for a single phase dc brushless motor.

Referring to FIG. 1, the driver circuit for the single phase dc brushless motor includes four transistors Q1, Q2, Q3, Q4, five resistors R1, R2, R3, R4, R5, a coil L1, a Hall element IC1, a driver element IC2, and a capacitor C1. The Hall element IC1 is used for detecting changes in a permanent magnetic field of a rotor to thereby output a weaker Hall voltage. And then the driver circuit IC2 magnifies the Hall voltage to further output alternative signals (square waveform) from two terminals O1 and O2. The coil L1 is alternatively actuated to change current direction, so as to rotate a rotor.

FIG. 2 illustrates a voltage diagram for time of the conventional driver circuit for the single phase dc brushless motor.

Referring to FIG. 2, the driver element IC2 has a restart function. The restart function of the driver element IC2 may be turned off when the motor is operated in a normal manner and turned on when the motor is operated in an abnormal manner, so as to allow a great current to pass through the coil L1 for only a short-term (a few seconds). When the motor is restarted by means of the restart function of the driver element IC2, the motor is driven by maximum current and thus it is available only for a low airflow motor or low power consumption motor. By contrast, a high airflow motor or high power consumption motor operating abnormally may endure great currents of more than 10 amperes to form a high pulse which results in damage to the transistor of the electronic components. The transistor cannot endure a great current or high pulse even if the driver element allows great current to pass through the coil for only a short-term.

The present invention intends to provide a dual current-limiting circuit that instantly turns on a first switch of a first limiting circuit adapted to suppress a voltage signal output to a coil while inputting a great abnormal input current, and subsequently turn on a second switch of a second limiting circuit adapted to suppress current passing there through at a low voltage level which is inadequate to damage the driver circuit. The dual current-limiting circuit is used to prevent the electronic components from damage due to inputting great abnormal input current in such a way as to mitigate and overcome the above problem.

SUMMARY OF THE INVENTION

The primary objective of this invention is to provide a dual current limiting circuit for a dc brushless motor which instantly turns on a first switch of a first limiting circuit adapted to supply a first voltage signal to a coil while limiting a great abnormal input current, and subsequently turned on a second switch of a second limiting circuit adapted to also suppress current passing therethrough but at a low voltage level which is inadequate to damage the driver circuit and still adequate to restart the motor if the great abnormal input current is eliminated.

The secondary objective of this invention is to provide a dual current-limiting circuit for a dc brushless motor which is adapted to suppress great current while auto-restarting, so as to avoiding instant great current or high pulses from passing through a coil and thereby being available for a high airflow fan motor.

The present invention is a dual current-limiting circuit for a dc brushless motor. The dual current-limiting circuit includes an over current detective circuit, an operation detective circuit, and a current limiting circuit. The over-current detective circuit produces a voltage signal that is used to determine whether an over current has been input to the motor. The operation detective circuit also produces a voltage signal used to determine whether the motor is operating in a normal manner. The current-limiting circuit decides to turn on a first switch of a first current limiting circuit and to subsequently turn on a second switch of a second current-limiting circuit depending upon the two voltage signals. When the second switch is turned on, the current-limiting circuit is capable of suppressing current passing through a coil at low voltage level, which is inadequate to damage a driver circuit and still adequate to restart the motor if the great abnormal input current is eliminated.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 1:
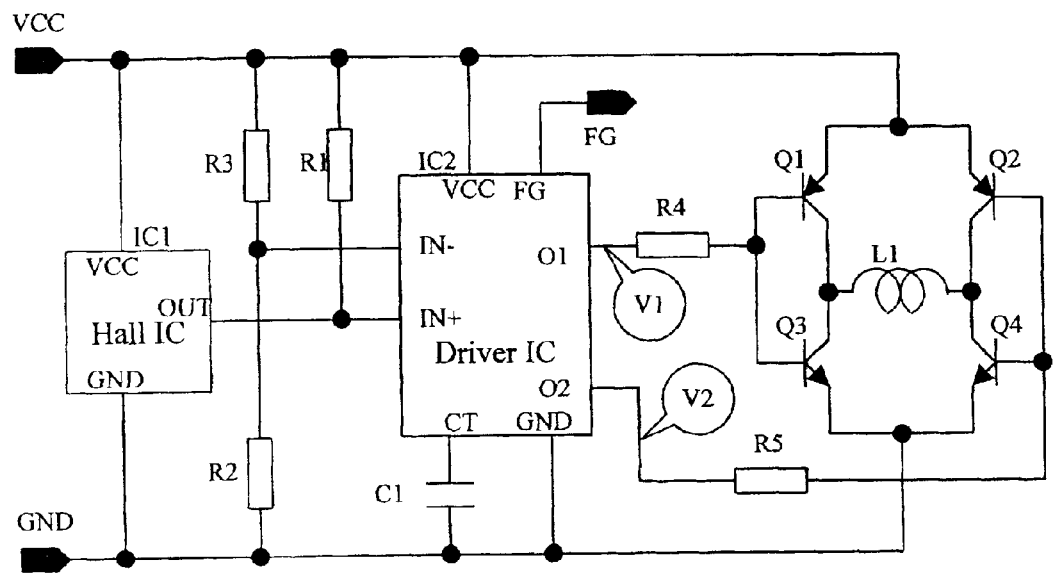
FIG. 1 is a schematic view of a conventional driver circuit for a single phase dc brushless motor.
Figure 2:
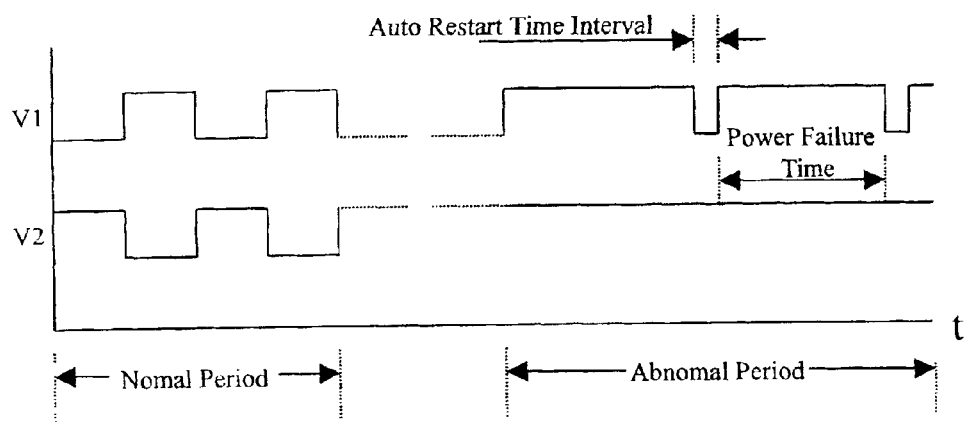
FIG. 2 is a voltage diagram for time of the conventional driver circuit for the single phase dc brushless motor.
Figure 3:
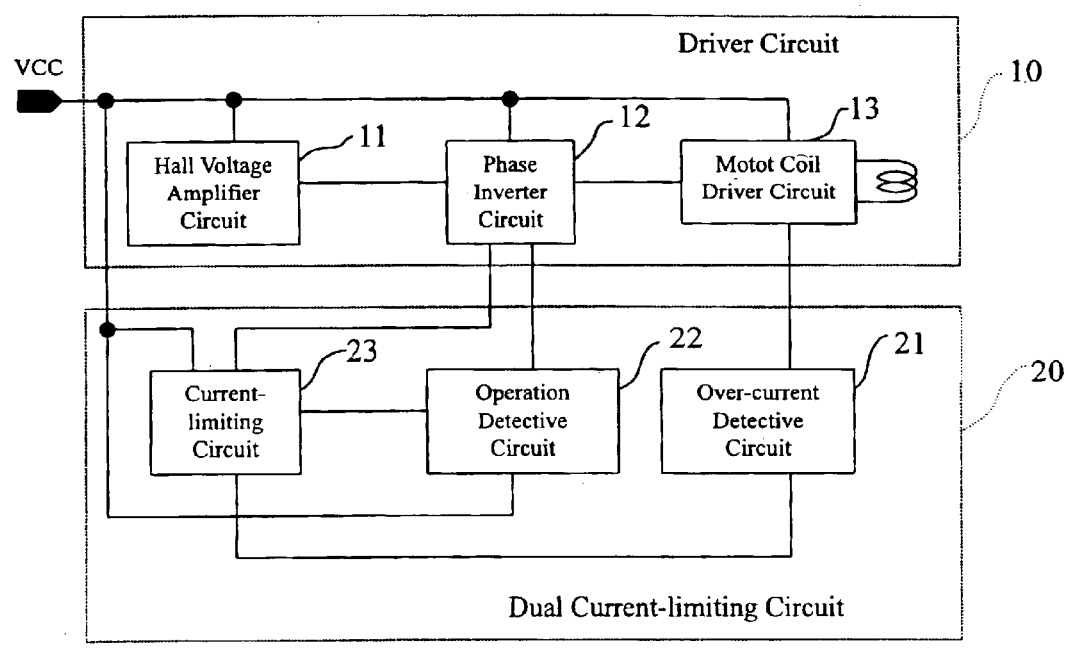
FIG. 3 is a block diagram of a dual current-limiting circuit for a dc brushless motor in accordance with the present invention.

FIG. 3 illustrates a block diagram of a dual current-limiting circuit for a dc brushless motor in accordance with the present invention.

Referring initially to FIG. 3, the motor circuit mainly includes a driver circuit 10 and a dual current-limiting circuit 20. The driver circuit 10 includes a Hall voltage amplifier circuit 11, a phase inverter circuit 12, and a motor coil driver circuit 13. The Hall voltage amplifier circuit 11 is used to amplify weak Hall voltage and output to the phase inverter circuit 12. The phase inverter circuit 12 inverts the phase of the amplified Hall voltage of the Hall voltage amplifier circuit 11 at 180° and then output to the motor coil driver circuit 13, so as to alternatively actuating the coil to rotate a rotor. The dual current-limiting circuit 20 includes an over-current detective circuit 21, an operation detective circuit 22, and a current-limiting circuit 23. The over-current detective circuit 21 comprises a resistor and produces a first voltage signal used to determine whether an over-current has been input to the motor. The operation detective circuit 22 retrieves the amplified Hall voltage of the Hall voltage amplifier circuit 11 whose rectifier/integral circuit produces a second voltage signal (high or low voltage level) that is used to determine whether the motor is operated in a normal manner. The current-limiting circuit 23 decides to turn on or off the current-limiting function depending upon the two voltage signals of the over-current detective circuit 21 and the operation detective circuit 22 to thereby control the driver circuit 10 of the phase inverter circuit 12. Current passing through the driver circuit 12 is suppressed at a low voltage level which is inadequate to damage it. The current-limiting circuit 23 comprises a comparator used to operate the two voltage signals of the over-current detective circuit 21 and the operation detective circuit 22 and then subsequently decides to turn on or off the current-limiting function.

Figure 4:
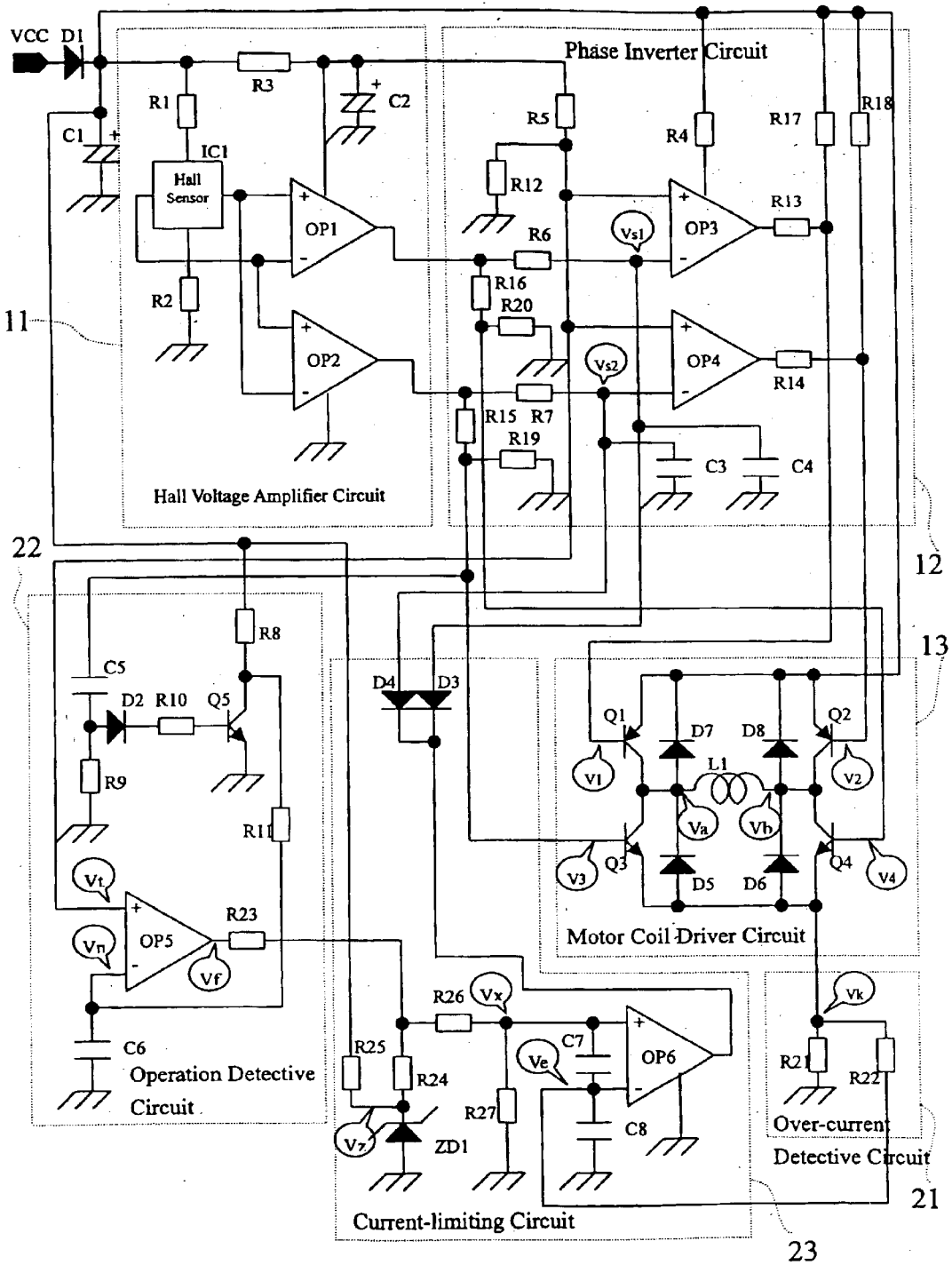
FIG. 4 is a block diagram of the dual current-limiting circuit for a dc brushless motor in accordance with the present invention.

FIG. 4 illustrates a block diagram of the dual current-limiting circuit for a dc brushless motor in accordance with the present invention. Referring to FIG. 4, the Hall voltage amplifier circuit 11 comprises a Hall element IC1, three resistors R1, R2, R3, a capacitor C2, and two operational amplifiers OP1 and OP2. The combination of the resistors R1 and R2 performs as a voltage drop circuit while the combination of the resistor R3 and the capacitor C2 forms a power supply circuit which is used to provide the operational amplifiers OP1 and OP2 with a stable low voltage level and low noise-voltage. The operational amplifiers OP1 and OP2 retrieve and amplify a weak Hall voltage and then output it to the phase inverter circuit 12.

The phase inverter circuit 12 mainly includes two operational amplifiers OP3 and ON whose negative input terminals (−) input signals from the Hall voltage amplifier circuit 11 and whose positive input terminals (+) input a reference voltage level for comparing therewith. For example, when the input terminals (−) of the operational amplifiers OP3 and ON respectively input a high voltage level and a low voltage level, the voltage level of the input terminal (−) of the operational amplifier ON is higher than a voltage reference of the input terminal (+). At this time, an output terminal of the operational amplifier ON produces a low voltage level. Meanwhile, the voltage level of the input terminal (−) of the operational amplifier OP3 is lower than a voltage reference of the input terminal (+) and an output terminal produces high voltage level. Consequently, the phase inverter circuit 12 inverts the input voltage level at 180° which further outputs to the motor coil driver circuit 13. Accordingly, the phase inverter circuit 12 performs as a low output impedance circuit of the motor coil driver circuit 13.

The motor coil driver circuit 13 includes four complementary bridge transistors Q1, Q2, Q3, Q4, and four diodes D5, D6, D7, D8 connected between collectors and emitters of the associated transistors Q1, Q2, Q3, Q4 which are used to absorb voltage of counter-electromotive pulse generated by alternatively actuating a coil L1. The transistors Q1 and Q2 are PNP transistors. A base of the transistor Q1 is connected to the operational amplifier OP3 through two resistors R13 and R14 while a base of the transistor Q2 is connected to the operational amplifier ON through two resistors R14 and R18. Output signals of the operational amplifiers OP3 and ON are complementary to the control current of the coil L1. By contrast, the transistors Q3 and Q4 are NPN transistors. A base of the transistor Q3 is connected to the operational amplifier OP1 through two resistors R15 and R19 while a base of the transistor Q4 connecting to the operational amplifier OP1 through two resistors R16 and R20. Output signals of the operational amplifiers OP1 and OP2 are complementary to the control current of the coil L1.

Figure 5:
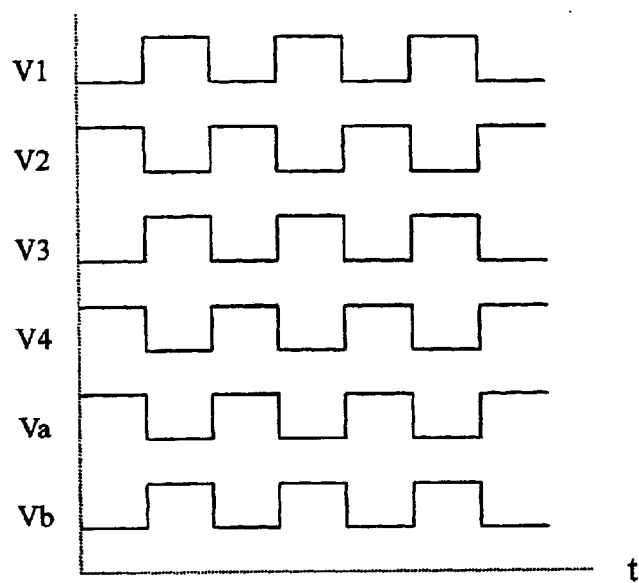
FIG. 5 is voltage diagrams for time of the dual current-limiting circuit at selected reference points in FIG. 4 in accordance with the present invention.

FIG. 5 illustrates voltage diagrams for time of the dual current-limiting circuit at selected reference points in FIG. 4 in accordance with the present invention. Referring to FIGS. 4 and 5, the selected reference points V1, V2, V3, V4 are the bases of the transistors Q1, Q2, Q3, Q4. The two selected reference points Va and Vb represent two ends of the coil L1 which produces alternative current to drive the motor.

Figure 6:
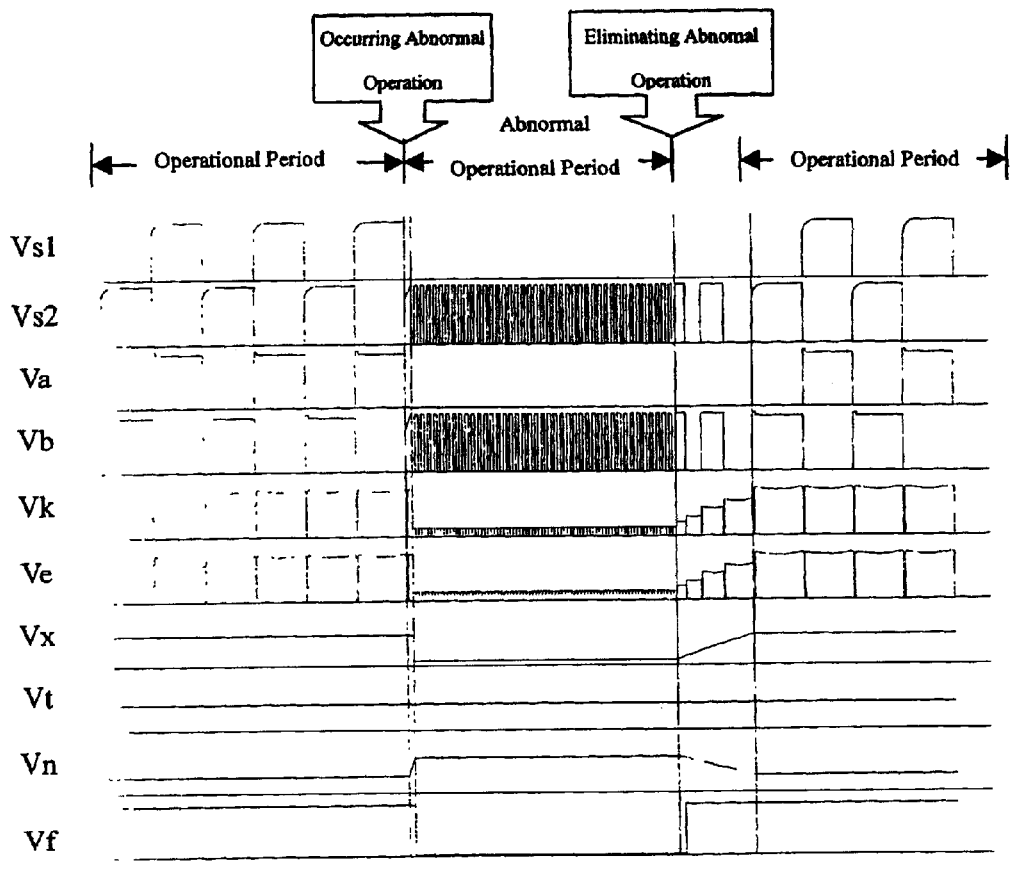
FIG. 6 is voltage diagrams for time of the dual current-limiting circuit at selected reference points in FIG. 4 in various situations in accordance with the present invention.

FIG. 6 illustrates voltage diagrams for time of the dual current-limiting circuit at selected reference points in FIG. 4 in various situations in accordance with the present invention. Referring to FIG. 6, each waveform performed at selected reference points comprises normal and abnormal operations.

Referring again to FIG. 4, the over-current detective circuit 21 includes a series connected resistor R21 connecting to the motor coil driver circuit 13. When the current of the motor coil driver circuit 13 is passing through the resistor R21, it may increase the voltage drop and thereby determine a voltage level limiting value output to the current-limiting circuit 23.

The operation detective circuit 22 includes a capacitor C5 and a resistor R9 combined to form a signal retrieving circuit connected to the 25 output terminal of the operational amplifier OP2, and a diode D2 and resistor 10 combined to form a detective circuit which may rectify the output signal of the operational amplifier OP2 to dc voltage. A transistor Q5 and a resistor R8 combine to form a signal amplifier circuit whose output signal is integrated by a resistor R11 and a capacitor C6 to form a constant dc voltage and then output to an input terminal of an operational amplifier OP5. During normal operation, the voltage of an input terminal (−) of the operational amplifier OP5 is lower than a reference voltage level of an input terminal (+) and thus the output terminal of the operational amplifier OP5 outputs a high voltage level as well as the operation detective circuit 22 outputs a high voltage level (normal signal) to the current-limiting circuit 23. During abnormal operation, since no input signal results in cutting off the transistor Q5, the voltage of an input terminal (−) of the operational amplifier OP5 is higher than the reference voltage level of the input terminal (+) and thus the output terminal of the operational amplifier OP5 outputs low voltage level as well as the operation detective circuit 22 outputs high voltage level (abnormal signal) to the current-limiting circuit 23.

The current-limiting circuit 23 includes two electronic switch elements D3 and D4, an operational amplifier OP6, a Zener diode ZD1, four resistors R24, R25, R26, R27, and two capacitors C7 and C8 to form a reference voltage level circuit. An input terminal (+) of the operational terminal OP6 is connected to the output of the operation detective circuit 22 while an input terminal (+) is connected to the output of the series connected resistor R21. The operational amplifier OP6 operates the input signals and then outputs high or low voltage levels from its output terminal to control turning on or off the electronic switch elements D3 and D4, thereby controlling the input terminals (−) of the operational amplifiers OP3 and ON of the phase inverter circuit 12. The resistor R25 and the Zener diode ZD1 of the current-limiting circuit 23 performs as a constant-voltage circuit, which supplies reference dc constant voltage level. Subsequently, the reference dc constant voltage level is divided by the resistors R23, R24, R26, R27 to serve as a reference voltage level of an input terminal (+) of an operational amplifier OP6. The reference voltage level Vx of the input terminal (+) of the operational amplifier have two levels: 1. Normal operation voltage level Vx1 and 2. Abnormal operation voltage level Vx2.

During normal operation, the operation detective circuit 22 outputs a high voltage level, which may produce a first voltage level Vx1 at a selected reference point of the resistor R27 after passing through the resistors R24 and R26.

During abnormal operation, the operation detective circuit 22 outputs a low voltage level, which may produce a second voltage level Vx2 at the selected reference point of the resistor R27 after passing through a series parallel connection of the resistors R23, R24, R26, R27. As the electronic switch elements D3 and D4 are turned on, the input terminals (−) of the operational amplifiers OP3 and OP4 are controlled at a low voltage level and thus the output terminals thereof output a high level, thereby controlling to actuate the driver circuit 10.

The first voltage level Vx1 is higher than the second voltage level Vx2, which are adjustable according to motor features and the current-limiting voltage level. The current-limiting circuit 23 performs its dual current-limiting function depending upon the high and low voltage level as well as dual voltage level. In the first limit stage, as the dual current-limiting circuit initially detects a current on the coil L1 exceeding maximum power consumption for normally operating the motor, the current passing through the coil L1 is limited and subsequently it turns on the second stage based on the high voltage level. In the second limit stage, since the current of the coil L1 is limited in the first stage, the coil L1 is still maintained at a low voltage level. Once the abnormal operation is eliminated, it is detected instantly and restarts the motor for which the low voltage level is adequate and necessary.

Referring again to FIG. 6, during normal operation, the alternative square waveforms at the selected reference points Vs1 and Vs2 are complementary. Similarly, alternative square waveforms at the selected reference points Va and Vb are also complementary. At the selected reference point Vk of the over-current detective circuit 21 is a high voltage level waveform with negative pulse output to the current-limiting circuit 23. The selected reference point Vn of the operation detective circuit 22 produces a low voltage level and retrieves an output signal of the operational amplifier OP2 of the Hall voltage amplifier circuit 11. The selected reference point Vf produces a high voltage level after the reference voltage level of the operation detective circuit 22 and low voltage level of the selected reference point Vn are operated in the operational amplifier OP5. At the selected reference point Vz, voltage is divided and then at the selected reference point Vx a high divided voltage adapted to be a reference level in the first limit stage is obtained for determining abnormal operation. As the voltage level at the selected reference point Vx is higher than that at the selected reference point Ve, the electronic switch elements D3 and D4 are turned off by reverse bias and thus the input signal of the input terminals (−) of the operational amplifiers OP3 and ON are uninfluenced. Consequently, the over-current detective circuit 21 is turned off in the first limit stage when the motor is operated in a normal manner.

Referring again to FIGS. 4 and 6, during abnormal operation, when the current passing through the coil L1 is increased tremendously, at the selected reference point the output voltage of the over-current detective circuit 21 is also increased tremendously. When the voltage level at the selected reference point Vk is higher than that at the selected reference point Vx, the over-current detective circuit 21 is turned on in the first stage. At this time, the current-limiting circuit 23 outputs a low voltage level to turn on the electronic switch elements D3 and D4. Meanwhile, the Hall voltage amplifier circuit 11 outputs no signal to the operation detective circuit 22 and it turns off the transistor Q5. Voltage at the selected reference point Vk must be higher than that at the selected reference point Vx after the low voltage level of the operational amplifier OP5 is output and divided at the selected reference point Vz to obtain a low voltage level at the selected reference point Vx. Consequently, the voltage level at the selected reference point Vx is adapted to be a reference voltage level in the second limit stage for determining whether to successively limit current and eliminate abnormal operation.

Referring again to FIGS. 4 and 6, when the resistor R22 and the capacitor C8 of the over-current detective circuit 21 are successively charged and discharged at the selected reference point Vk, the current-limiting circuit 23 produces an oscillating signal. The oscillating signal is output to the selected reference points Vs1 and Vs2, thereby not only limiting the amplitude of vibration of the phase inverter circuit 12 but also outputting a small amplitude of the oscillating signal to the motor coil driver circuit 13 by means of an oscillating circuit which consists of the resistor R6 and capacitor C4, the resistor R7 and capacitor C3, the resistor R22, and a capacitor C8. Consequently, an average restart current for the coil L1 is produced.

Although the invention has been described in details with references to its presently preferred embodiment, it will be understood by one of ordinary skill in the art that various modifications can be made without departing from the spirit and the scope of the invention, as set forth in the appended claims.

What is claimed is:

1. A dual current-limiting circuit for a dc brushless motor comprising:

an over-current detective circuit for producing a first voltage signal when an over-current motor input is detected;

an operation detective circuit for producing a second voltage signal indicative of whether the motor is operated normally; and a current-limiting circuit having two stages for successively limiting current input to the motor depending upon the first and second voltage signals, including:

a first limit stage for initially limiting current and applying a first voltage level to a coil of the motor, and a second limit stage for successively limiting current and applying to the coil of the motor a second relatively low voltage level that is different from the first voltage level, and that is sufficient to facilitate start-up of the motor without causing damage to a driver circuit of the motor.

2. The dual current-limiting circuit for a dc brushless motor as defined in claim 1, wherein the driver circuit comprises a Hall voltage amplifier circuit, a phase inverter circuit, and a motor coil driver circuit.

3. The dual current-limiting circuit for a dc brushless motor as defined in claim 2, wherein the over-current detective circuit retrieves voltage of the motor coil driver circuit and then outputs a reference voltage level.

4. The dual current-limiting circuit for a dc brushless motor as defined in claim 2, wherein the operation detective circuit retrieves an alternative signal of the Hall voltage amplifier circuit and then outputs a reference voltage level.

5. The dual current-limiting circuit for a dc brushless motor as defined in claim 2, wherein the circuit-limiting circuit a outputs signal to the phase inverter circuit via an electronic switch element, thereby controlling the phase inverter circuit output to the motor coil driver circuit.

6. The dual current-limiting circuit for a dc brushless motor as defined in claim 2, wherein the motor coil driver circuit comprises four complementary bridge transistors.

7. The dual current-limiting circuit for a dc brushless motor as defined in claim 6, wherein the motor coil driver circuit is applied to a single phase motor.

8. The dual current-limiting circuit for a dc brushless motor as defined in claim 2, wherein during abnormal operation, the over-current detective circuit operates in the first limit stage and outputs a terminating signal to the current-limiting circuit, so as to change to the second limit stage for successively limiting current at low voltage level which is inadequate to damage the driver circuit and still adequate to restart the motor until abnormal conditions are eliminated.

* * * * *